US009613651B1

(12) United States Patent
Mizukami

(10) Patent No.: US 9,613,651 B1
(45) Date of Patent: Apr. 4, 2017

(54) BEARING APPARATUS, SPINDLE MOTOR, AND DISK DRIVE APPARATUS

(71) Applicant: Nidec Corporation, Kyoto (JP)

(72) Inventor: Junya Mizukami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/343,386

(22) Filed: Nov. 4, 2016

(30) Foreign Application Priority Data

Nov. 6, 2015 (JP) .............................. 2015-218040

(51) Int. Cl.
*G11B 19/20* (2006.01)
*F16C 17/10* (2006.01)
*F16C 33/10* (2006.01)

(52) U.S. Cl.
CPC ........ *G11B 19/2036* (2013.01); *F16C 17/107* (2013.01); *F16C 33/107* (2013.01); *F16C 2370/12* (2013.01)

(58) Field of Classification Search
None
See application file for complete search history.

(56) References Cited

U.S. PATENT DOCUMENTS

| 5,533,812 A * | 7/1996 | Leuthold | F16C 17/107 384/107 |
| 5,795,074 A * | 8/1998 | Rahman | F16C 17/045 384/121 |
| 6,132,094 A * | 10/2000 | Cornelison | F16C 17/04 384/121 |
| 6,350,059 B1 * | 2/2002 | Takahashi | F16C 17/04 384/123 |
| 6,493,181 B1 * | 12/2002 | Ichiyama | F16C 17/107 360/98.07 |
| 6,768,236 B2 * | 7/2004 | Tokunaga | F16C 17/02 310/90 |
| 6,781,268 B2 * | 8/2004 | Oku | F16C 17/10 310/90 |

(Continued)

FOREIGN PATENT DOCUMENTS

| JP | 2004-270820 A | 9/2004 |
| JP | 2004270820 A * | 9/2004 |

*Primary Examiner* — Will J Klimowicz
(74) *Attorney, Agent, or Firm* — Keating & Bennett, LLP

(57) ABSTRACT

This bearing apparatus includes a shaft portion, a sleeve portion, and a fluid arranged between the shaft portion and the sleeve portion. A thrust dynamic pressure portion is filled with the fluid, and a surface of the fluid is defined in a seal portion. The thrust dynamic pressure portion includes a dynamic pressure generation portion including thrust dynamic pressure grooves, an intermediate portion arranged outside of the dynamic pressure generation portion and including an annular groove in the shape of a circular ring, and a discharge portion arranged outside of the annular groove and including discharge grooves. The annular groove is arranged to have a depth smaller than a minimum radial width of the seal portion. This makes it easier for any air bubble in the thrust dynamic pressure portion to travel into the seal portion in accordance with a flow of the fluid caused in the discharge portion to be discharged outward. This reduces the likelihood that any air bubble will stay in the vicinity of the dynamic pressure generation portion.

15 Claims, 8 Drawing Sheets

(56) References Cited

U.S. PATENT DOCUMENTS

| | | | | |
|---|---|---|---|---|
| 7,290,934 B2* | 11/2007 | Nishimura | ............ | F16C 17/107 384/107 |
| 7,578,621 B2* | 8/2009 | Nishimura | ............ | F16C 17/107 384/107 |
| 7,740,407 B2* | 6/2010 | Asada | ................... | F16C 17/107 384/107 |
| 7,950,854 B2* | 5/2011 | Asada | ................... | F16C 17/107 384/100 |
| 2006/0051001 A1* | 3/2006 | Nishimura | ............ | F16C 17/107 384/100 |

* cited by examiner

BEARING APPARATUS, SPINDLE MOTOR, AND DISK DRIVE APPARATUS

CROSS REFERENCE TO RELATED APPLICATIONS

This application claims the benefit of priority to Japanese Patent Application No. 2015-218040 filed Nov. 6, 2015. The entire contents of this application is hereby incorporated herein by reference.

BACKGROUND OF THE INVENTION

1. Field of the Invention

The present invention relates to a bearing apparatus, a spindle motor, and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to generate a torque centered on a central axis through magnetic flux generated between the stationary portion and the rotating portion, so that the rotating portion is caused to rotate with respect to the stationary portion.

A fluid dynamic bearing apparatus, for example, is used as a bearing apparatus to support the rotating portion such that the rotating portion is rotatable with respect to the stationary portion. A known spindle motor including a fluid dynamic bearing apparatus is described in, for example, JP-A 2004-270820.

The fluid dynamic bearing apparatus includes a dynamic pressure generation portion in which a dynamic pressure groove is defined in a member of a stationary portion or a member of a rotating portion. Accordingly, once the rotating portion starts rotating, a dynamic pressure is generated in a fluid arranged between the member of the stationary portion and the member of the rotating portion. This produces a supporting force that supports the rotating portion with respect to the stationary portion. In the fluid dynamic bearing apparatus as described above, an air bubble may be introduced into the fluid, or an air bubble may be generated in the fluid due to a change in pressure on the fluid, while the rotating portion is rotating. If any air bubble stays in the vicinity of the dynamic pressure generation portion, the dynamic pressure generated in the dynamic pressure generation portion may become unstable.

SUMMARY OF THE INVENTION

A bearing apparatus according to a preferred embodiment of the present invention includes a shaft portion, a sleeve portion, and a fluid arranged between the shaft portion and the sleeve portion, wherein the shaft portion includes a columnar portion arranged to extend along a central axis, an annular portion arranged to extend radially outward from the columnar portion, and a tubular portion arranged to extend from the annular portion to one axial side. The sleeve portion is arranged on the one axial side of the annular portion, radially outside of the columnar portion, and radially inside of the tubular portion. A radial dynamic pressure portion, a thrust dynamic pressure portion, and a seal portion are defined between the shaft portion and the sleeve portion. The radial dynamic pressure portion is defined in a gap between an outer circumferential surface of the columnar portion and an inner circumferential surface of the sleeve portion. The thrust dynamic pressure portion is defined in a gap between a first thrust surface and a second thrust surface, the first thrust surface being an end surface of the annular portion on the one axial side, the second thrust surface being an end surface of the sleeve portion on another axial side. The seal portion is defined in a gap between an inner circumferential surface of the tubular portion and an outer circumferential surface of the sleeve portion. Each of the radial dynamic pressure portion and the thrust dynamic pressure portion is filled with the fluid. The seal portion has a surface of the fluid defined therein. The thrust dynamic pressure portion includes a dynamic pressure generation portion, an intermediate portion, and a discharge portion. The dynamic pressure generation portion includes a plurality of thrust dynamic pressure grooves defined in one of the first and second thrust surfaces, each thrust dynamic pressure groove extending from a radially inner side to a radially outer side. The intermediate portion is arranged radially outside of the dynamic pressure generation portion, and includes an annular groove in a shape of a circular ring with the central axis as a center defined in one of the first and second thrust surfaces. The discharge portion is arranged radially outside of the annular groove, and includes a plurality of discharge grooves defined in one of the first and second thrust surfaces, each discharge groove extending from the radially inner side to the radially outer side. The annular groove is arranged to have a depth smaller than a minimum radial width of the seal portion.

The above preferred embodiment of the present invention is able to achieve a reduction in the likelihood that any air bubble will stay in the vicinity of the dynamic pressure generation portion.

The above and other elements, features, steps, characteristics and advantages of the present invention will become more apparent from the following detailed description of the preferred embodiments with reference to the attached drawings.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that an axial direction is a vertical direction, and that a side on which an armature is arranged with respect to a base portion is an upper side, and the shape of each member or portion and relative positions of different members or portions will be described based on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Also note that the wording "parallel direction" as used herein includes both parallel and substantially parallel directions. Also note that the wording "perpendicular direction" as used herein includes both perpendicular and substantially perpendicular directions.

Figure 1:
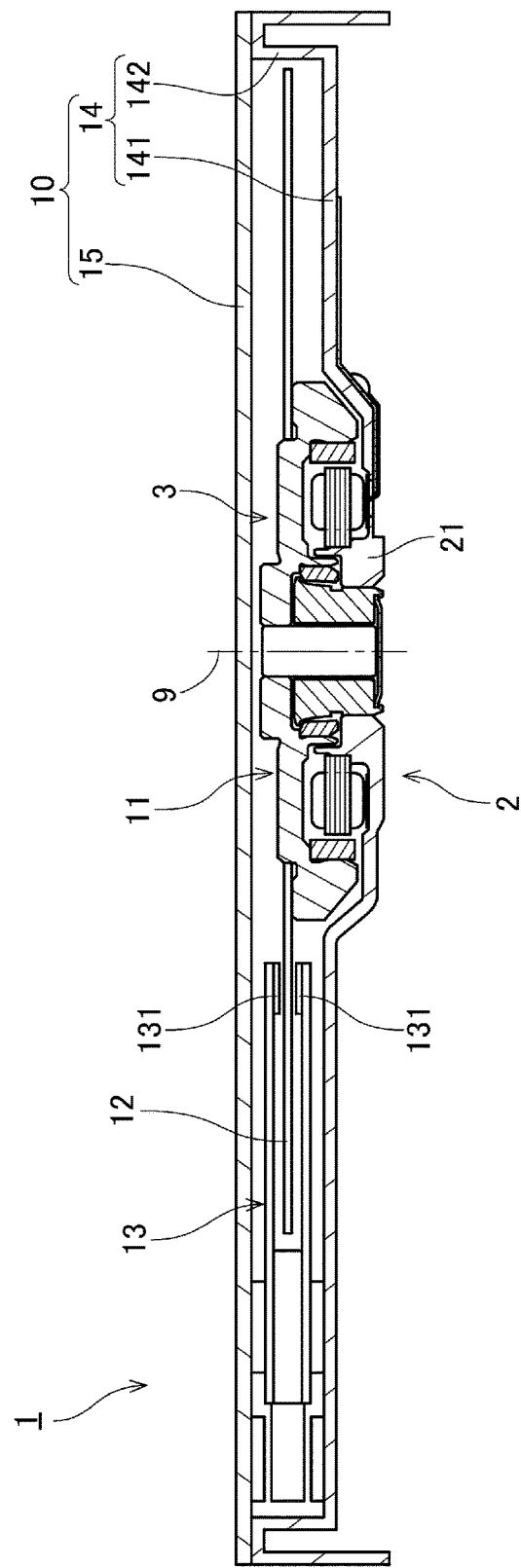
FIG. 1 is a vertical sectional view of a disk drive apparatus according to a first preferred embodiment of the present invention.

FIG. 1 is a vertical sectional view of a disk drive apparatus 1 according to a first preferred embodiment of the present invention. The disk drive apparatus 1 is, for example, an apparatus arranged to perform reading and writing of information from or to a magnetic disk 12 while rotating the magnetic disk 12. Referring to FIG. 1, the disk drive apparatus 1 includes a spindle motor 11, the magnetic disk 12, an access portion 13, and a housing 10.

The spindle motor 11 is arranged to rotate the magnetic disk 12 about a central axis 9 while supporting the magnetic disk 12. The spindle motor 11 includes a base portion 21 arranged to extend perpendicularly or substantially perpendicularly to the central axis 9.

The access portion 13 is arranged to move heads 131 along recording surfaces of the magnetic disk 12 to perform the reading and the writing of information from or to the magnetic disk 12.

The housing 10 includes a housing body 14 defined integrally with the base portion 21, and a cover 15 arranged to cover an upper side of the housing body 14. The housing body 14 includes a bottom portion 141 arranged to extend perpendicularly or substantially perpendicularly to the central axis 9 below a rotating portion 3 of the spindle motor 11, the magnetic disk 12, and the access portion 13, and a wall portion 142 arranged to extend upward from an outer circumference of the bottom portion 141. The rotating portion 3 of the spindle motor 11, the magnetic disk 12, and the access portion 13 are accommodated in the housing 10.

Note that the disk drive apparatus 1 may alternatively be arranged to include two or more magnetic disks 12. Also note that the access portion 13 may alternatively be arranged to perform only one of the reading and the writing of information from or to the magnetic disk 12.

Figure 2:
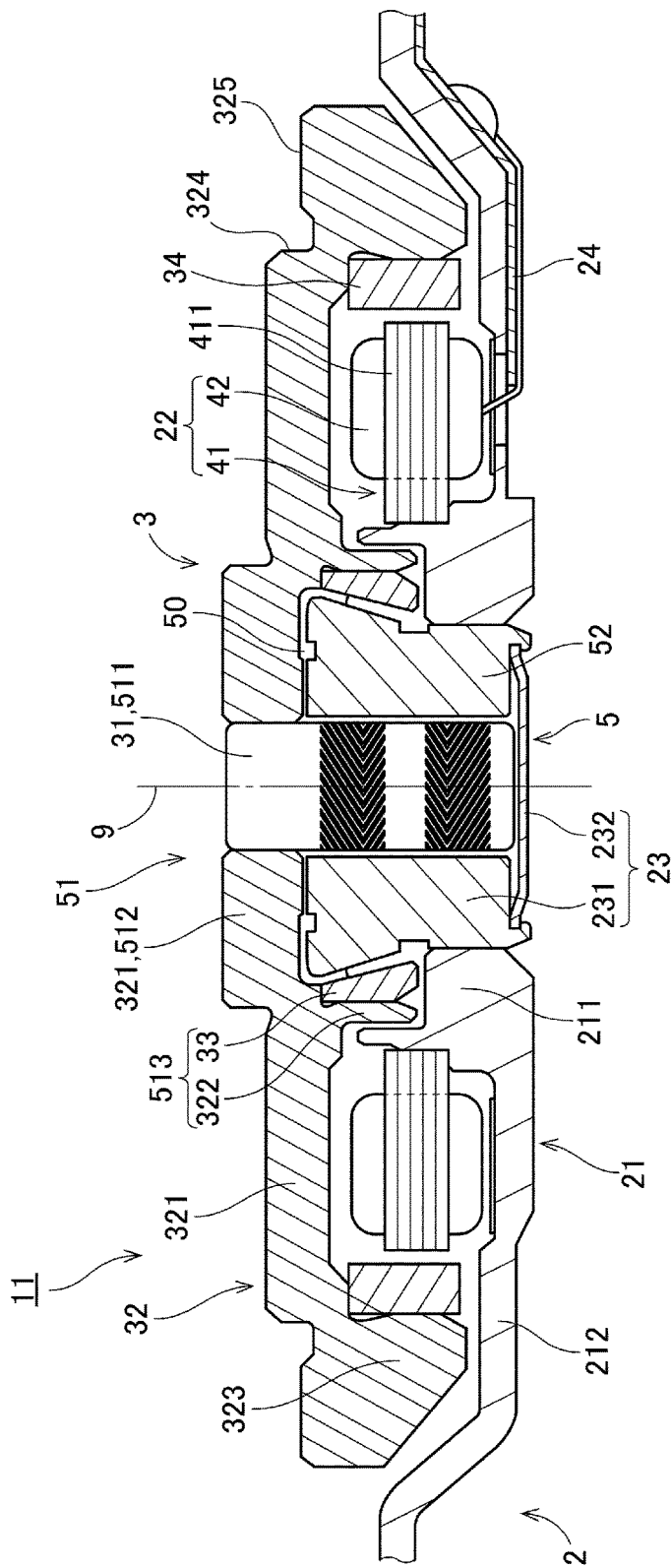
FIG. 2 is a vertical sectional view of a spindle motor according to the first preferred embodiment.
Figure 3:
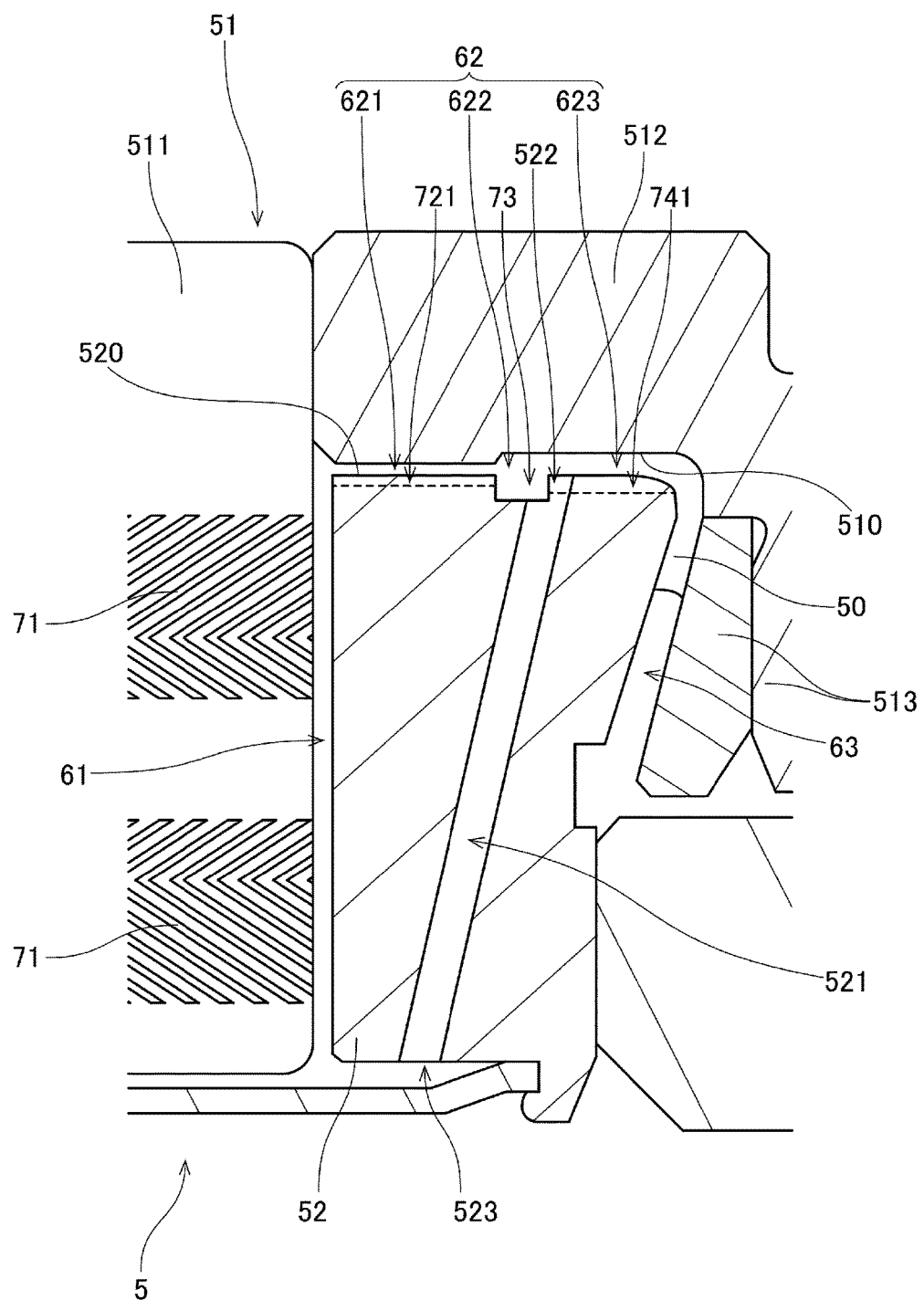
FIG. 3 is a partial vertical sectional view of the spindle motor according to the first preferred embodiment.

Next, the structure of the spindle motor 11 will now be described below. FIG. 2 is a vertical sectional view of the spindle motor 11. FIG. 3 is a partial vertical sectional view of the spindle motor 11.

Referring to FIG. 1, the spindle motor 11 includes a stationary portion 2 and the rotating portion 3. The stationary portion 2 is arranged to be stationary relative to the housing 10. The rotating portion 3 is supported to be rotatable with respect to the stationary portion 2.

Referring to FIG. 2, the stationary portion 2 according to the present preferred embodiment includes the base portion 21, an armature 22, a stationary bearing unit 23, and a circuit board 24.

The base portion 21 is arranged to extend perpendicularly or substantially perpendicularly to the central axis 9 below the rotating portion 3. Referring to FIG. 1, the base portion 21 defines a portion of the bottom portion 141 of the housing body 14. The housing body 14 is defined by, for example, subjecting a metal plate material to press working. Note, however, that the housing body 14 may alternatively be defined by another process, such as, for example, a casting process or a cutting process.

Referring to FIG. 2, the base portion 21 includes a cylindrical portion 211 and a bottom plate portion 212. The cylindrical portion 211 is a substantially cylindrical portion arranged to extend in the vertical direction with the central axis 9 as a center. A sleeve 231 of the stationary bearing unit 23, which will be described below, is fixed to an inner circumferential surface of the cylindrical portion 211. The bottom plate portion 212 is a plate-shaped portion arranged to extend radially outward from a lower end portion of the cylindrical portion 211. The armature 22 and a portion of the rotating portion 3 are arranged above the bottom plate portion 212.

The armature 22 includes a stator core 41 and a plurality of coils 42. The stator core 41 is defined, for example, by laminated steel sheets, that is, electromagnetic steel sheets, such as silicon steel sheets, placed one upon another in the axial direction. The stator core 41 is fixed to an outer circumferential surface of the cylindrical portion 211. In addition, the stator core 41 includes a plurality of teeth 411 arranged to project radially outward. The teeth 411 are preferably arranged at substantially regular intervals in the circumferential direction. Each coil 42 is defined by a conducting wire wound around a separate one of the teeth 411.

The stationary bearing unit 23 includes the sleeve 231 and a cap 232. The sleeve 231 is arranged to extend in the axial direction to assume a substantially cylindrical shape around a shaft 31, which will be described below. A lower portion of the sleeve 231 is arranged radial inside of the cylindrical portion 211 of the base portion 21, and is fixed to the cylindrical portion 211 through, for example, an adhesive. An inner circumferential surface of the sleeve 231 is arranged radially opposite to an outer circumferential surface of the shaft 31. The cap 232 is arranged to close a lower opening of the sleeve 231. Note that the sleeve 231 may be defined by a plurality of members.

The circuit board 24 is arranged on a lower surface of the bottom plate portion 212 of the base portion 21. A flexible printed circuit board, which has flexibility, is used as the circuit board 24 according to the present preferred embodiment. The circuit board 24 is electrically connected to the conducting wires defining the coils 42. An electric drive current is supplied to each coil 42 through the circuit board 24.

The rotating portion 3 is supported to be rotatable about the central axis 9, which extends in the vertical direction. The rotating portion 3 according to the present preferred embodiment includes the shaft 31, a hub 32, an annular member 33, and a magnet 34.

The shaft 31 is a substantially columnar member arranged to extend in the axial direction radially inside of the sleeve 231. A metal, such as, for example, a ferromagnetic or nonmagnetic stainless steel, is used as a material of the shaft 31. An upper end portion of the shaft 31 is arranged to project above an upper surface of the sleeve 231.

The hub 32 includes a hub body portion 321, an annular projection 322, and a magnet fixing portion 323. The hub body portion 321 is arranged to extend radially outward from a peripheral portion of the upper end portion of the shaft 31. The annular projection 322 is arranged to project downward from a lower surface of the hub body portion 321 radially outside of the sleeve 231. The annular projection 322 is arranged to extend in the vertical direction to assume a substantially cylindrical shape with the central axis 9 as a center. The annular member 33 is fixed to an inner circumferential surface of the annular projection 322. An inner circumferential surface of the annular member 33 is arranged radially opposite to an outer circumferential surface of the sleeve 231.

The magnet fixing portion 323 is arranged to project downward from the lower surface of the hub body portion 321, and is arranged radially outside of the armature 22. An inner circumferential surface of the magnet fixing portion 323 defines a substantially cylindrical surface extending in the vertical direction with the central axis 9 as a center. The magnet 34 is fixed to the inner circumferential surface of the magnet fixing portion 323.

In addition, the hub body portion 321 includes a first holding surface 324, which is substantially cylindrical, and a second holding surface 325 arranged to extend radially outward from a lower end portion of the first holding surface 324. An inner circumferential portion of the magnetic disk 12 is arranged to be in contact with at least a portion of the first holding surface 324. In addition, a lower surface of the magnetic disk 12 is arranged to be in contact with at least a portion of the second holding surface 325. The magnetic disk 12 is thus held.

A lubricating fluid 50 is arranged between the stationary bearing unit 23 and a combination of the shaft 31, the hub 32, and the annular member 33. The combination of the shaft 31, the hub 32, and the annular member 33 is supported to be rotatable with respect to the stationary bearing unit 23 through the lubricating fluid 50. That is, in the present preferred embodiment, a bearing mechanism 5 is defined by the sleeve 231 and the cap 232, which are components of the stationary portion 2, the shaft 31, the hub 32, and the annular member 33, which are components of the rotating portion 3, and the lubricating fluid 50 arranged therebetween. The structure of the bearing mechanism 5 will be described in detail below.

The magnet 34 is arranged radially outside of the armature 22, and is fixed to the magnet fixing portion 323 of the hub 32. The magnet 34 according to the present preferred embodiment is in the shape of a circular ring. An inner circumferential surface of the magnet 34 is arranged radially opposite to a radially outer end surface of each of the teeth 411. In addition, the inner circumferential surface of the magnet 34 includes north and south poles arranged to alternate with each other in the circumferential direction.

Note that, in place of the annular magnet 34, a plurality of magnets may be used. In the case where the plurality of magnets are used, the magnets are arranged in the circumferential direction such that north and south poles alternate with each other.

Once, in the spindle motor 11 described above, electric drive currents are supplied to the coils 42 through the circuit board 24, magnetic flux is generated around each of the teeth 411. Then, interaction between the magnetic flux of the teeth 411 and magnetic flux of the magnet 34 produces a circumferential torque, so that the rotating portion 3 is caused to rotate about the central axis 9 with respect to the stationary portion 2. The magnetic disk 12 supported by the hub 32 is caused to rotate about the central axis 9 together with the rotating portion 3.

Figure 4:
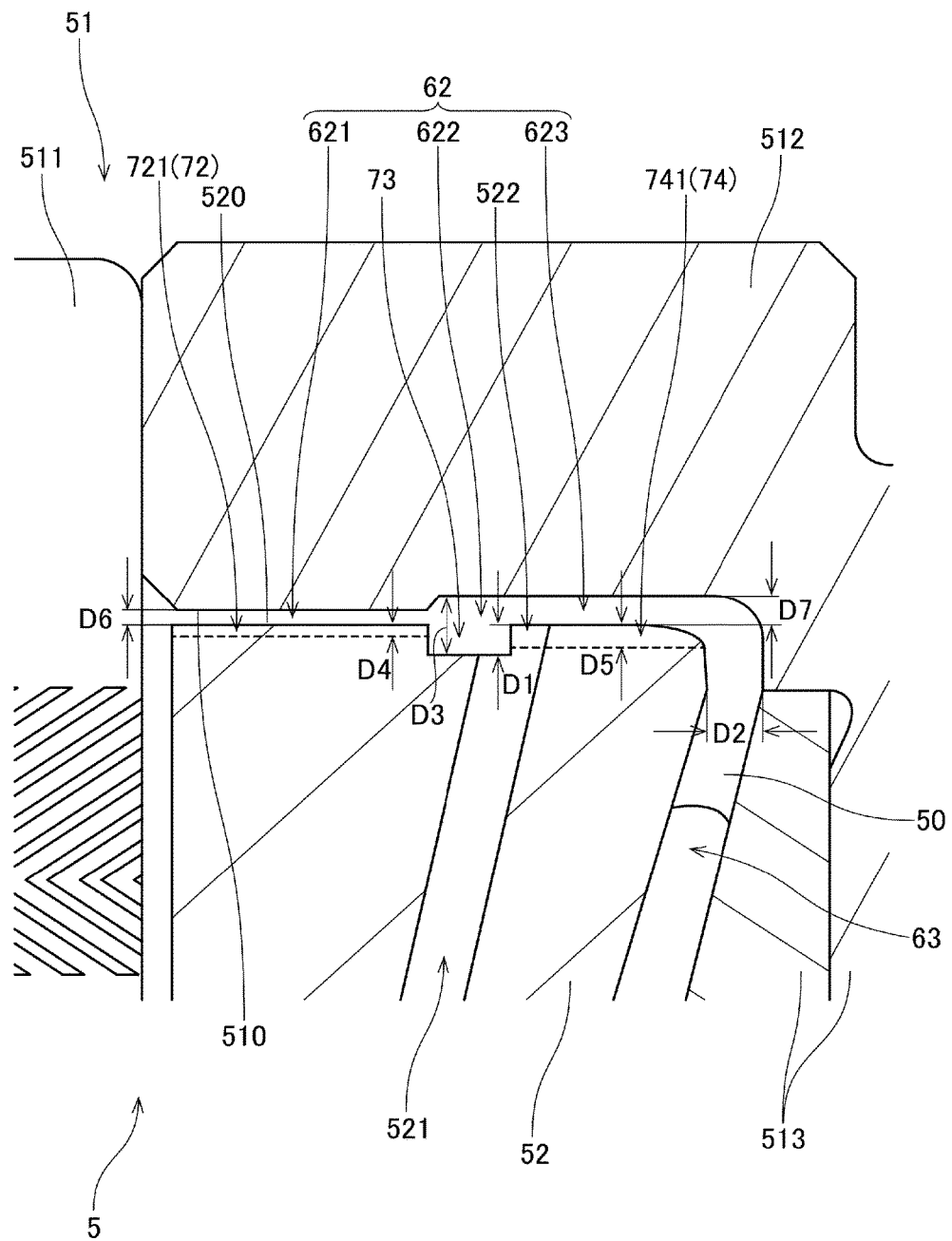
FIG. 4 is a partial vertical sectional view of the spindle motor according to the first preferred embodiment.
Figure 5:
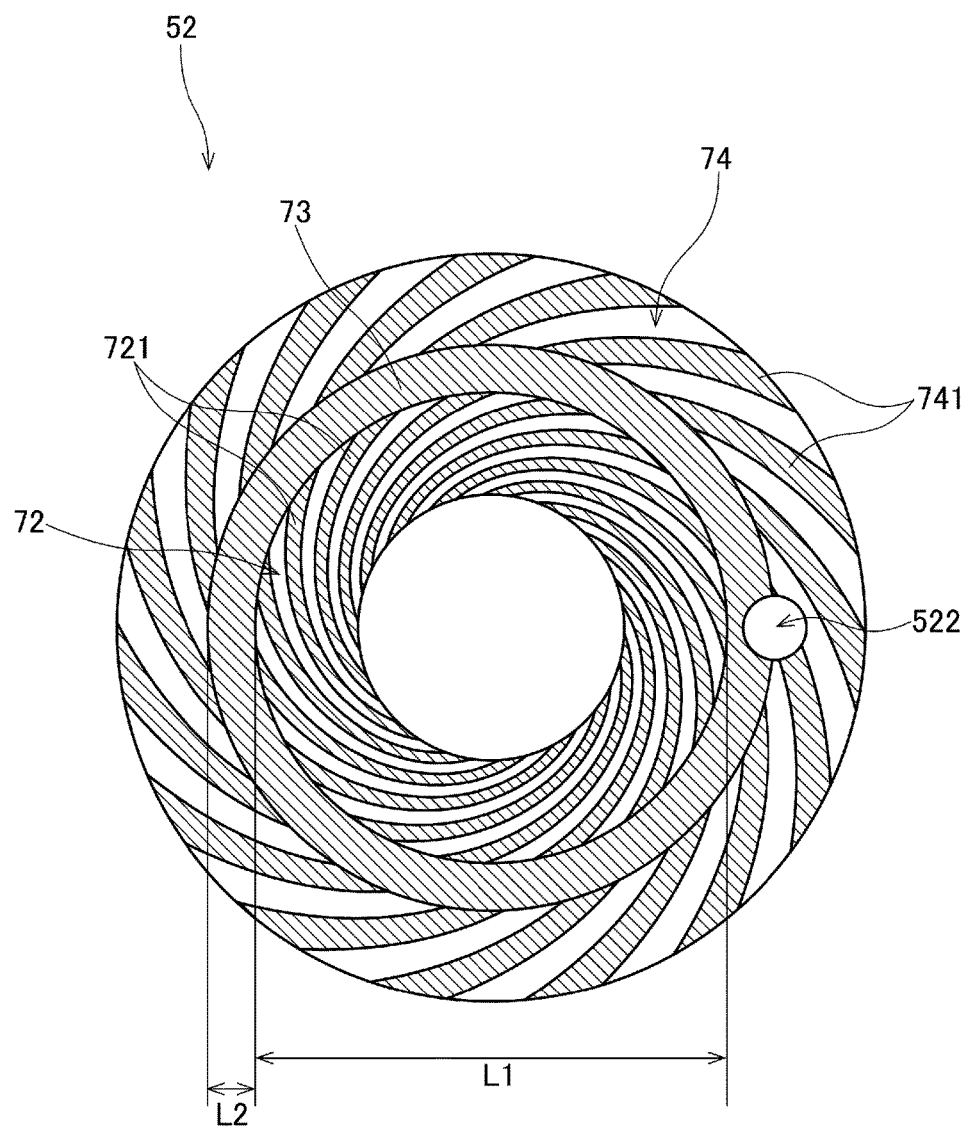
FIG. 5 is a top view of a sleeve according to the first preferred embodiment.

Next, the structure of the bearing mechanism 5, which is included in the spindle motor 11, will now be described below. Each of FIGS. 3 and 4 is a partial vertical sectional view of the spindle motor 11, illustrating the bearing mechanism 5 and its vicinity. FIG. 5 is a top view of the sleeve 231. The bearing mechanism 5 is a fluid dynamic bearing apparatus. In each of FIGS. 3 and 4, the position of a bottom surface of each of a thrust dynamic pressure groove and a discharge groove is represented by a broken line. In addition, in FIG. 5, groove regions, which are recessed downward from an upper end surface of the sleeve 231, are represented by oblique lines.

Referring to FIGS. 2 to 4, the bearing mechanism 5 is defined by a shaft portion 51, a sleeve portion 52, and the lubricating fluid 50 arranged between the shaft portion 51 and the sleeve portion 52. A polyolester oil or a diester oil, for example, is used as the lubricating fluid 50.

As described above, in the spindle motor 11, the lubricating fluid 50 is arranged between the stationary bearing unit 23 and the combination of the shaft 31, the hub 32, and the annular member 33. That is, in the present preferred embodiment, the shaft portion 51 is defined by the shaft 31, a portion of the hub 32, and the annular member 33. Meanwhile, the sleeve portion 52 is defined by the sleeve 231 of the stationary bearing unit 23.

The shaft portion 51 includes a columnar portion 511 arranged to extend along the central axis 9, an annular portion 512 arranged to extend radially outward from the columnar portion 511, and a tubular portion 513 arranged to extend from the annular portion 512 to one axial side (downward, in the present preferred embodiment). The columnar portion 511 is defined by the shaft 31. The annular portion 512 is defined by a portion of the hub body portion 321 of the hub 32 which lies radially inward of the annular projection 322. The tubular portion 513 is defined by the annular projection 322 of the hub 32 and the annular member 33.

Although the shaft portion 51 according to the present preferred embodiment is defined by a plurality of members, this is not essential to the present invention. The shaft portion 51 may alternatively be defined by a single monolithic member including the columnar portion 511, the annular portion 512, and the tubular portion 513.

The sleeve portion 52 is arranged on the one axial side (i.e., a lower side) of the annular portion 512, radially outside of the columnar portion 511, and radially inside of the tubular portion 513. A liquid surface of the lubricating fluid 50 is defined between the sleeve portion 52 and the tubular portion 513.

Referring to FIGS. 3 to 5, the sleeve portion 52 includes a communicating hole 521 arranged to extend from an upper surface to a lower surface thereof. The communicating hole 521 includes a first opening 522 defined in an end surface of the sleeve portion on another axial side (i.e., an upper side), and a second opening 523 defined in an end surface of the sleeve portion 52 on the one axial side (i.e., the lower side). The communicating hole 521 is filled with the lubricating fluid 50.

The spindle motor 11 according to the present preferred embodiment is a rotating-shaft motor. Accordingly, as illustrated in FIG. 2, the stationary portion 2 includes the sleeve portion 52 of the bearing mechanism 5 and the armature 22, while the rotating portion 3 includes the shaft portion 51 of the bearing mechanism 5 and the magnet 34. The shaft portion 51 is supported through the lubricating fluid 50 to be rotatable with respect to the sleeve portion 52. The rotating portion 3 is thus supported to be rotatable about the central axis 9 with respect to the stationary portion 2.

Referring to FIG. 3, a radial dynamic pressure portion 61, a thrust dynamic pressure portion 62, and a seal portion 63 are defined between the shaft portion 51 and the sleeve portion 52.

The radial dynamic pressure portion 61 is defined in a gap between an outer circumferential surface of the columnar portion 511 and an inner circumferential surface of the sleeve portion 52. The radial dynamic pressure portion 61 is filled with the lubricating fluid 50. Upper and lower radial dynamic pressure groove arrays 71, each of which is arranged in a herringbone pattern, are defined in the outer circumferential surface of the columnar portion 511.

While the spindle motor 11 is running, the shaft portion 51 rotates with respect to the sleeve portion 52. At this time, each radial dynamic pressure groove array 71 induces a dynamic pressure in a portion of the lubricating fluid 50 which is present between the outer circumferential surface of the columnar portion 511 and the inner circumferential surface of the sleeve portion 52. The shaft portion 51 is thus radially supported with respect to the sleeve portion 52. Note that the radial dynamic pressure groove array 71 is defined in at least one of the outer circumferential surface of the columnar portion 511 and the inner circumferential surface of the sleeve portion 52.

The thrust dynamic pressure portion 62 is defined between a first thrust surface 510, which is an end surface of the annular portion 512 on the one axial side (i.e., the lower side), and a second thrust surface 520, which is the end surface of the sleeve portion 52 on the other axial side (i.e., the upper side). The thrust dynamic pressure portion 62 is filled with the lubricating fluid 50.

Referring to FIG. 5, a thrust dynamic pressure groove array 72 arranged in a spiral pattern, an annular groove 73, and a discharge groove array 74 arranged in a spiral pattern are defined in the second thrust surface 520. The thrust dynamic pressure groove array 72 is made up of a plurality of thrust dynamic pressure grooves 721 each of which is arranged to extend from a radially inner side to a radially outer side. The annular groove 73 is a groove in the shape of a circular ring with the central axis 9 as a center. The annular groove 73 is arranged radially outside of the thrust dynamic pressure groove array 72 and radially inside of the discharge groove array 74. The discharge groove array 74 is made up of a plurality of discharge grooves 741 each of which is arranged to extend from the radially inner side to the radially outer side. The discharge groove array 74 is arranged radially outside of the thrust dynamic pressure groove array 72 and the annular groove 73.

Thus, the thrust dynamic pressure portion 62 includes a dynamic pressure generation portion 621, an intermediate portion 622, and a discharge portion 623. The dynamic pressure generation portion 621 is defined between the first thrust surface 510 and an annular portion of the second thrust surface 520 in which the thrust dynamic pressure groove array 72 is defined. The intermediate portion 622 is defined between the first thrust surface 510 and an annular portion of the second thrust surface 520 in which the annular groove 73 is defined. The discharge portion 623 is defined between the first thrust surface 510 and an annular portion of the second thrust surface 520 in which the discharge groove array 74 is defined.

While the spindle motor 11 is running, the thrust dynamic pressure groove array 72 induces a dynamic pressure in a portion of the lubricating fluid 50 which is present at the dynamic pressure generation portion 621. The dynamic pressure generated at the dynamic pressure generation portion 621 causes the shaft portion 51 to be axially supported with respect to the sleeve portion 52.

In addition, while the spindle motor 11 is running, the discharge groove array 74 induces a dynamic pressure in a portion of the lubricating fluid 50 which is present at the discharge portion 623. The dynamic pressure generated at the discharge portion 623 is smaller than the dynamic pressure generated at the dynamic pressure generation portion 621.

Although, in the present preferred embodiment, all of the thrust dynamic pressure groove array 72, the annular groove 73, and the discharge groove array 74, which define the dynamic pressure generation portion 621, the intermediate portion 622, and the discharge portion 623, respectively, are defined in the second thrust surface 520, this is not essential to the present invention. Each of the thrust dynamic pressure groove array 72, the annular groove 73, and the discharge groove array 74 is defined in at least one of the first and second thrust surfaces 510 and 520.

The seal portion 63 is defined between an inner circumferential surface of the tubular portion 513 and an outer circumferential surface of the sleeve portion 52. The radial width of the seal portion 63 is arranged to gradually increase with decreasing height. A surface of the lubricating fluid 50 is defined in the seal portion 63.

While the spindle motor 11 is running, an air bubble may be introduced into the lubricating fluid 50 in the vicinity of the surface of the lubricating fluid 50, or an air bubble may be generated in the lubricating fluid 50 due to a change in pressure on the lubricating fluid 50. If such an air bubble is drawn into the dynamic pressure generation portion 621, the pressure of the dynamic pressure generated at the dynamic pressure generation portion 621 will become unstable.

In the bearing mechanism 5, the intermediate portion 622, which includes the annular groove 73, is arranged between the dynamic pressure generation portion 621 and the discharge portion 623. Provision of the annular groove 73 results in an increase in the distance between the first and second thrust surfaces 510 and 520 at the intermediate portion 622. This produces a tendency of any air bubble to stay in the intermediate portion 622. Accordingly, any air bubble tends to stay in the intermediate portion 622 rather than in the dynamic pressure generation portion 621. As a result, the likelihood that any air bubble in the thrust dynamic pressure portion 62 will stay in the vicinity of the dynamic pressure generation portion 621 is reduced.

Any air bubble staying in the intermediate portion 622 will be discharged out of the lubricating fluid 50 through the seal portion 63 due to a flow of the lubricating fluid 50 caused in the discharge portion 623. Referring to FIG. 4, in the bearing mechanism 5, the annular groove 73 is arranged to have an axial depth D1 smaller than a minimum radial width D2 of the seal portion 63. Thus, the seal portion 63 is arranged to have a sufficient radial width to cause any air bubble traveling in accordance with the flow of the lubricating fluid 50 caused in the discharge portion 623 to easily travel toward the surface of the lubricating fluid 50 in the seal portion 63. This allows any air bubble in the thrust dynamic pressure portion 62 to be easily discharged out of the lubricating fluid 50.

In the present preferred embodiment, each of the thrust dynamic pressure groove array 72, the annular groove 73, and the discharge groove array 74 is defined in the second thrust surface 520. When all of the thrust dynamic pressure groove array 72, the annular groove 73, and the discharge groove array 74 are defined in the same surface, working processes for the thrust dynamic pressure groove array 72, the annular groove 73, and the discharge groove array 74 can be easily carried out. This leads to an improvement in efficiency with which the spindle motor 11 is manufactured.

Note that all of the thrust dynamic pressure groove array 72, the annular groove 73, and the discharge groove array 74 may alternatively be defined in the first thrust surface 510. Also note that at least one of the thrust dynamic pressure groove array 72, the annular groove 73, and the discharge groove array 74 may alternatively be defined in the first thrust surface 510, with at least one of the rest being defined in the second thrust surface 520.

Referring to FIGS. 3 to 5, the first opening 522, which is defined in the second thrust surface 520, is arranged to axially overlap at least in part with the annular groove 73. This makes it easier for any air bubble traveling into the thrust dynamic pressure portion 62 through the communicating hole 521 to head toward the intermediate portion 622. This reduces the likelihood that any air bubble will be drawn into the dynamic pressure generation portion 621.

Further, in the present preferred embodiment, the first opening 522 is arranged radially outward of the dynamic pressure generation portion 621. This further reduces the likelihood that any air bubble traveling into the thrust dynamic pressure portion through the communicating hole 521 will be drawn into the dynamic pressure generation portion 621.

Referring to FIG. 4, in the present preferred embodiment, an axial distance D3 between the first and second thrust surfaces 510 and 520 at the intermediate portion 622 is smaller than the minimum radial width D2 of the seal portion 63. The greater radial width of the seal portion 63 makes it easier for any air bubble traveling in accordance with the flow of the lubricating fluid 50 caused in the discharge portion 623 to head toward the surface of the lubricating fluid 50 in the seal portion 63. This in turn makes it easier for any air bubble in the thrust dynamic pressure portion 62 to be discharged out of the lubricating fluid 50.

Notice that the "axial distance between the first and second thrust surfaces 510 and 520" refers to the axial distance between the first and second thrust surfaces 510 and 520 while the spindle motor 11 is running. While the spindle motor 11 is running, the rotation of the rotating portion 3, which includes the shaft portion 51, generates a dynamic pressure in the thrust dynamic pressure portion 62, lifting the shaft portion 51 with respect to the sleeve portion 52. Therefore, the axial distance between the first and second thrust surfaces 510 and 520 while the spindle motor 11 is running is greater than the axial distance between the first and second thrust surfaces 510 and 520 when the spindle motor 11 is not running.

Further, referring to FIG. 4, the axial depth D1 of the annular groove 73 is greater than both an axial depth D4 of each thrust dynamic pressure groove 721 and an axial depth D5 of each discharge groove 741. The depth D1 of the annular groove 73 being greater than the depth D4 of the thrust dynamic pressure groove 721 facilitates a flow of the lubricating fluid 50 from the dynamic pressure generation portion 621 to the intermediate portion 622. This makes it easier for any air bubble in the dynamic pressure generation portion 621 to travel to the intermediate portion 622. This in turn contributes to preventing the air bubble from staying in the vicinity of the dynamic pressure generation portion 621.

Meanwhile, the depth D1 of the annular groove 73 being greater than the depth D5 of the discharge groove 741 facilitates a flow of the lubricating fluid 50 between the intermediate portion 622 and the discharge portion 623. This makes it easier for any air bubble to travel from the intermediate portion 622 to the discharge portion 623. This in turn makes it easier for any air bubble in the thrust dynamic pressure portion 62 to be discharged out of the lubricating fluid 50 through the surface of the lubricating fluid 50 in the seal portion 63.

In addition, referring to FIG. 4, the axial position of the first thrust surface 510 is arranged to be lower at the dynamic pressure generation portion 621 than at the intermediate portion 622 and the discharge portion 623. That is, the first thrust surface 510 includes a shoulder causing a change in the axial position thereof.

As a result, an axial distance D6 between the first and second thrust surfaces 510 and 520 at the dynamic pressure generation portion 621 is smaller than an axial distance D7 between the first and second thrust surfaces 510 and 520 at the discharge portion 623. The reduction in the axial distance D6 between the first and second thrust surfaces 510 and 520 at the dynamic pressure generation portion 621 contributes to increasing the dynamic pressure generated in the dynamic pressure generation portion 621.

Meanwhile, the increase in the axial distance D7 between the first and second thrust surfaces 510 and 520 at the discharge portion 623 makes it easier for any air bubble to travel in the discharge portion 623. This makes it easier for any air bubble to travel from the intermediate portion 622 to the seal portion 63 through the discharge portion 623. This in turn makes it easier for any air bubble in the thrust dynamic pressure portion 62 to be discharged out of the lubricating fluid 50 through the surface of the lubricating fluid 50 in the seal portion 63.

Referring to FIG. 5, in the present preferred embodiment, each of the discharge grooves 741 included in the discharge groove array 74 is joined to the annular groove 73 at a radially inner end thereof. Joining of the radially inner end of at least one of the discharge grooves 741 to the annular groove 73 makes it easier for any air bubble in the annular groove 73 to travel to the seal portion 63 through the discharge groove 741. This in turn makes it easier for any air bubble in the annular groove 73 to be discharged out of the lubricating fluid 50.

In the present preferred embodiment, the outside diameter (diameter) L1 of the dynamic pressure generation portion 621 is 4.7 millimeters. The radial width of the intermediate portion 622, i.e., the radial width L2 of the annular groove 73, is 0.2 millimeters. In the case where the outside diameter L1 of the dynamic pressure generation portion 621 is in the range of about 4.0 millimeters to about 5.5 millimeters, the radial width L2 of the annular groove 73 is preferably arranged to be in the range of about 0.1 millimeters to about 0.5 millimeters.

In addition, the depth D1 of the annular groove 73 is preferably arranged to be in the range of about 30 micrometers to about 65 micrometers. The depth D4 of each thrust dynamic pressure groove 721 is preferably arranged to be in the range of about 10 micrometers to about 20 micrometers.

The depth D5 of each discharge groove 741 is preferably arranged to be in the range of about 15 micrometers to about 40 micrometers.

While preferred embodiments of the present invention have been described above, it will be understood that the present invention is not limited to the above-described preferred embodiments.

Figure 6:
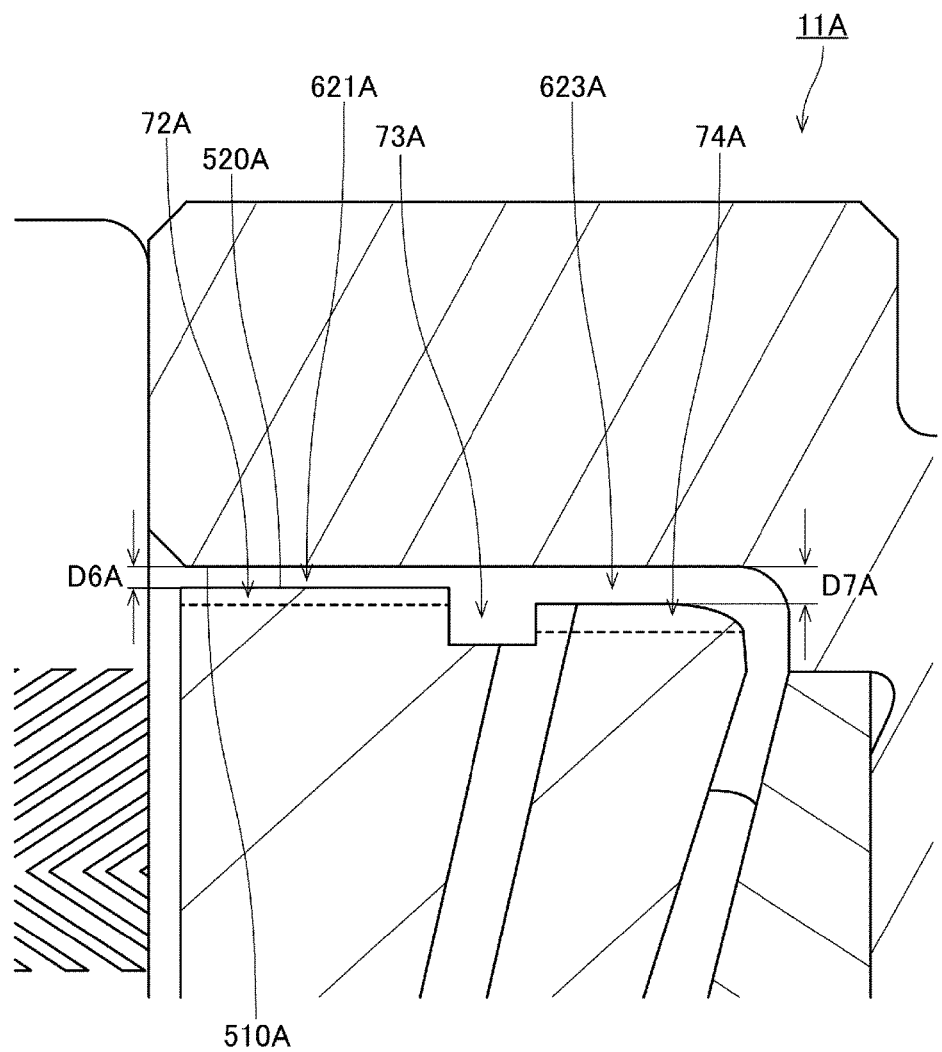
FIG. 6 is a partial sectional view of a spindle motor according to a modification of the first preferred embodiment.

FIG. 6 is a partial vertical sectional view of a spindle motor 11A according to a modification of the first preferred embodiment. In the modification illustrated in FIG. 6, the axial position of a second thrust surface 520A is arranged to be higher at a dynamic pressure generation portion 621A than at a discharge portion 623A. That is, the second thrust surface 520A includes a shoulder causing a change in the axial position thereof. As a result, an axial distance D6A between a first thrust surface 510A and the second thrust surface 520A at the dynamic pressure generation portion 621A is smaller than an axial distance D7A between the first and second thrust surfaces 510A and 520A at the discharge portion 623A.

In the above-described preferred embodiment, the shoulder is defined in the first thrust surface 510, and the thrust dynamic pressure groove array 72, the annular groove 73, and the discharge groove array 74 are defined in the second thrust surface 520. However, as in the modification illustrated in FIG. 6, a thrust dynamic pressure groove array 72A, an annular groove 73A, a discharge groove array 74A, and the shoulder may be defined in the second thrust surface 520A.

Figure 7:
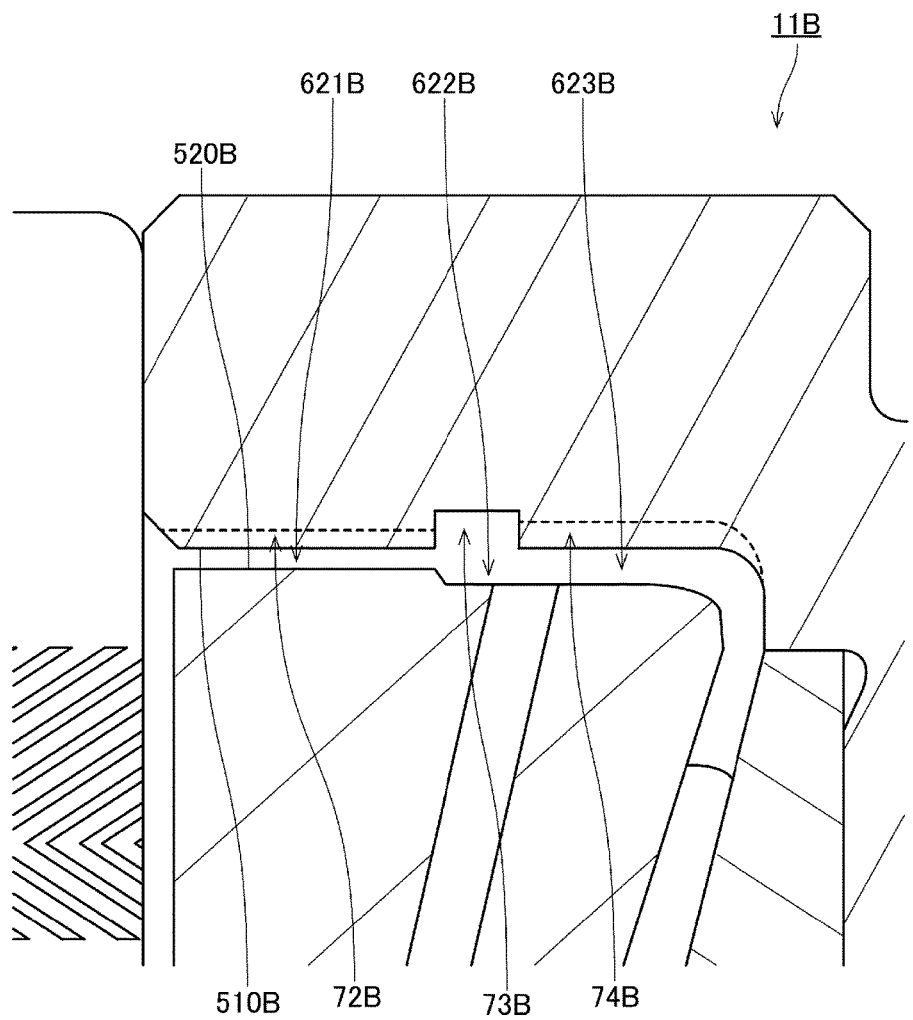
FIG. 7 is a partial sectional view of a spindle motor according to a modification of the first preferred embodiment.

FIG. 7 is a partial sectional view of a spindle motor 11B according to another modification of the first preferred embodiment. In the modification illustrated in FIG. 7, a thrust dynamic pressure groove array 72B, an annular groove 73B, and a discharge groove array 74B are defined in a first thrust surface 510B. In addition, the axial position of a second thrust surface 520B is arranged to be higher at a dynamic pressure generation portion 621B than at an intermediate portion 622B and a discharge portion 623B. That is, the second thrust surface 520B includes a shoulder causing a change in the axial position thereof.

As in the modification illustrated in FIG. 7, the thrust dynamic pressure groove array 72B, the annular groove 73B, and the discharge groove array 74B may be defined in the first thrust surface 510B, with the shoulder being defined in the second thrust surface 520B.

Figure 8:
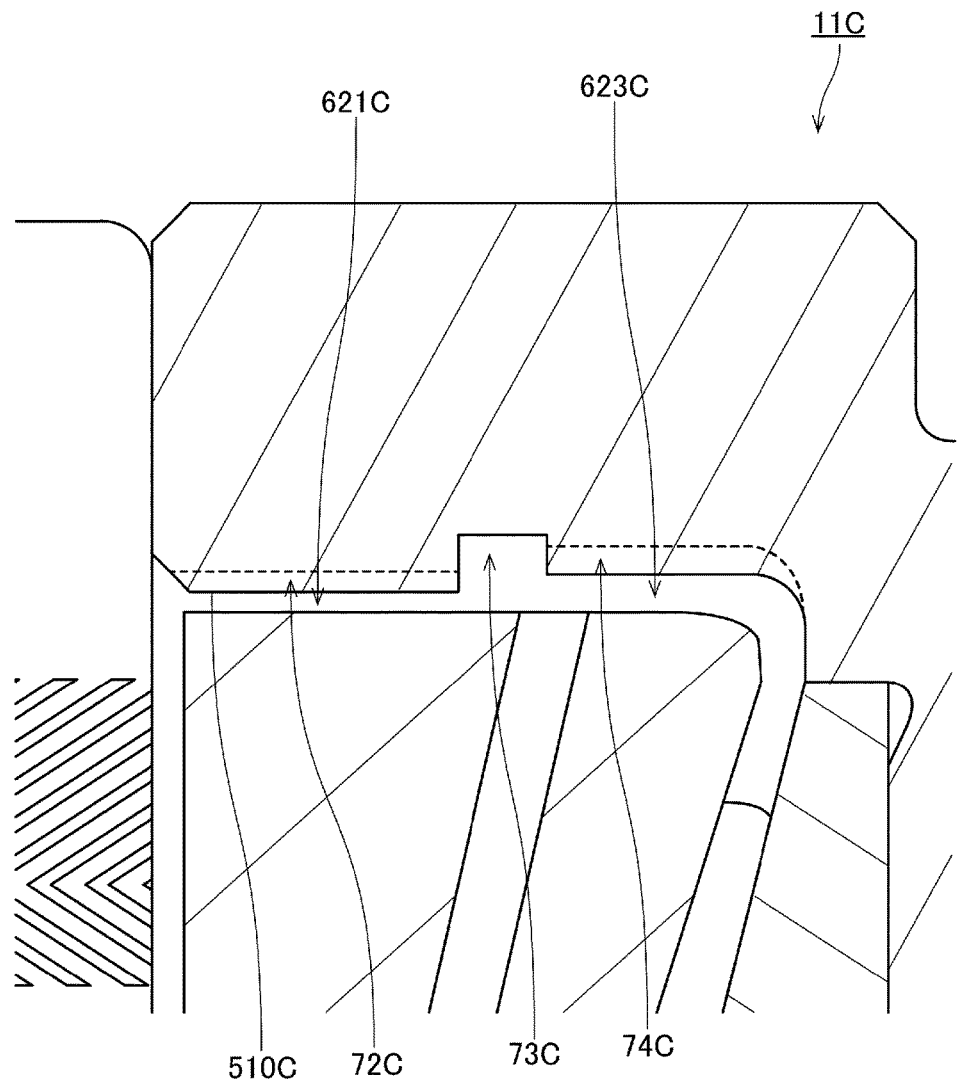
FIG. 8 is a partial sectional view of a spindle motor according to a modification of the first preferred embodiment.

FIG. 8 is a partial sectional view of a spindle motor 11C according to yet another modification of the first preferred embodiment. In the modification illustrated in FIG. 8, a thrust dynamic pressure groove array 72C, an annular groove 73C, and a discharge groove array 74C are defined in a first thrust surface 510C. In addition, the axial position of the first thrust surface 510C is arranged to be lower at a dynamic pressure generation portion 621C than at a discharge portion 623C. That is, the first thrust surface 510C includes a shoulder causing a change in the axial position thereof.

As in the modification illustrated in FIG. 8, the thrust dynamic pressure groove array 72C, the annular groove 73C, the discharge groove array 74C, and the shoulder may be defined in the first thrust surface 510C.

Although, in each of the above-described preferred embodiments and the modifications thereof, all of the thrust dynamic pressure groove array, the annular groove, and the discharge groove array are defined in the same one of the first and second thrust surfaces, this is not essential to the present invention. At least one of the thrust dynamic pressure groove array, the annular groove, and the discharge groove array may be defined in the first thrust surface, with the rest being defined in the second thrust surface.

Although each of the above-described preferred embodiments and the modifications thereof is applied to a spindle motor of a rotating-shaft type, this is not essential to the present invention. A bearing mechanism according to a preferred embodiment of the present invention may be applied to a spindle motor of a fixed-shaft type. In the spindle motor of the fixed-shaft type, a stationary portion includes a shaft portion and an armature, and a rotating portion includes a sleeve portion and a magnet. In addition, the sleeve portion is supported through a lubricating fluid to be rotatable with respect to the shaft portion.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to bearing apparatuses, spindle motors, and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bearing apparatus comprising a shaft portion, a sleeve portion, and a fluid arranged between the shaft portion and the sleeve portion, wherein
   the shaft portion includes:
   a columnar portion arranged to extend along a central axis;
   an annular portion arranged to extend radially outward from the columnar portion; and
   a tubular portion arranged to extend from the annular portion to one axial side;
   the sleeve portion is arranged on the one axial side of the annular portion, radially outside of the columnar portion, and radially inside of the tubular portion;
   the shaft portion and the sleeve portion have a gap therebetween, the gap including:
   a radial dynamic pressure portion defined in a gap between an outer circumferential surface of the columnar portion and an inner circumferential surface of the sleeve portion;
   a thrust dynamic pressure portion defined in a gap between a first thrust surface and a second thrust surface, the first thrust surface being an end surface of the annular portion on the one axial side, the second thrust surface being an end surface of the sleeve portion on another axial side; and
   a seal portion defined in a gap between an inner circumferential surface of the tubular portion and an outer circumferential surface of the sleeve portion;
   each of the radial dynamic pressure portion and the thrust dynamic pressure portion is filled with the fluid;
   the seal portion has a surface of the fluid defined therein;
   the thrust dynamic pressure portion includes:
   a dynamic pressure generation portion including a plurality of thrust dynamic pressure grooves defined in one of the first and second thrust surfaces, each thrust dynamic pressure groove extending from a radially inner side to a radially outer side;

an intermediate portion arranged radially outside of the dynamic pressure generation portion, and including an annular groove in a shape of a circular ring with the central axis as a center defined in one of the first and second thrust surfaces; and a discharge portion arranged radially outside of the annular groove, and including a plurality of discharge grooves defined in one of the first and second thrust surfaces, each discharge groove extending from the radially inner side to the radially outer side; and the annular groove is arranged to have a depth smaller than a minimum radial width of the seal portion.

2. The bearing apparatus according to claim 1, wherein all of the thrust dynamic pressure grooves, the annular groove, and the discharge grooves are defined in the same one of the first and second thrust surfaces.

3. The bearing apparatus according to claim 1, wherein the sleeve portion includes a communicating hole having a first opening defined in the second thrust surface, and a second opening defined in an end surface of the sleeve portion on the one axial side; and the first opening is arranged to axially overlap at least in part with the annular groove.

4. The bearing apparatus according to claim 3, wherein the first opening is arranged radially outward of the dynamic pressure generation portion.

5. The bearing apparatus according to claim 1, wherein an axial distance between the first and second thrust surfaces at the intermediate portion is arranged to be smaller than the minimum radial width of the seal portion.

6. The bearing apparatus according to claim 1, wherein at least one of the discharge grooves is joined to the annular groove at a radially inner end thereof.

7. The bearing apparatus according to claim 1, wherein the annular groove is arranged to have a depth greater than at least one of a depth of each thrust dynamic pressure groove and a depth of each discharge groove.

8. The bearing apparatus according to claim 7, wherein the annular groove is arranged to have a depth greater than both the depth of each thrust dynamic pressure groove and the depth of each discharge groove.

9. The bearing apparatus according to claim 1, wherein an axial distance between the first and second thrust surfaces at the dynamic pressure generation portion is arranged to be smaller than an axial distance between the first and second thrust surfaces at the discharge portion.

10. The bearing apparatus according to claim 1, wherein the dynamic pressure generation portion is arranged to have an outside diameter in a range of about 4.0 millimeters to about 5.5 millimeters; and the annular groove is arranged to have a radial width in a range of about 0.1 millimeters to about 0.5 millimeters.

11. The bearing apparatus according to claim 1, wherein the annular groove is arranged to have a depth in a range of about 30 micrometers to about 65 micrometers;

each thrust dynamic pressure groove is arranged to have a depth in a range of about 10 micrometers to about 20 micrometers; and each discharge groove is arranged to have a depth in a range of about 15 micrometers to about 40 micrometers.

12. A spindle motor comprising:

the bearing apparatus of claim 1;

a stationary portion including the sleeve portion and an armature; and a rotating portion including the shaft portion and a magnet, and arranged to be rotatable about the central axis with respect to the stationary portion.

13. A disk drive apparatus comprising:

the spindle motor of claim 12;

an access portion arranged to perform at least one of reading and writing of information from or to a disk supported by the rotating portion; and a housing arranged to accommodate the rotating portion and the access portion.

14. A spindle motor comprising:

the bearing apparatus of claim 1;

a stationary portion including the shaft portion and an armature; and a rotating portion including the sleeve portion and a magnet, and arranged to be rotatable about the central axis with respect to the stationary portion.

15. A disk drive apparatus comprising:

the spindle motor of claim 14;

an access portion arranged to perform at least one of reading and writing of information from or to a disk supported by the rotating portion; and a housing arranged to accommodate the rotating portion and the access portion.

* * * * *